Oct. 19, 1965     R. H. WENTORF, JR., ETAL     3,212,853
HIGH DENSITY SILICON
Filed July 30, 1962                          2 Sheets-Sheet 1
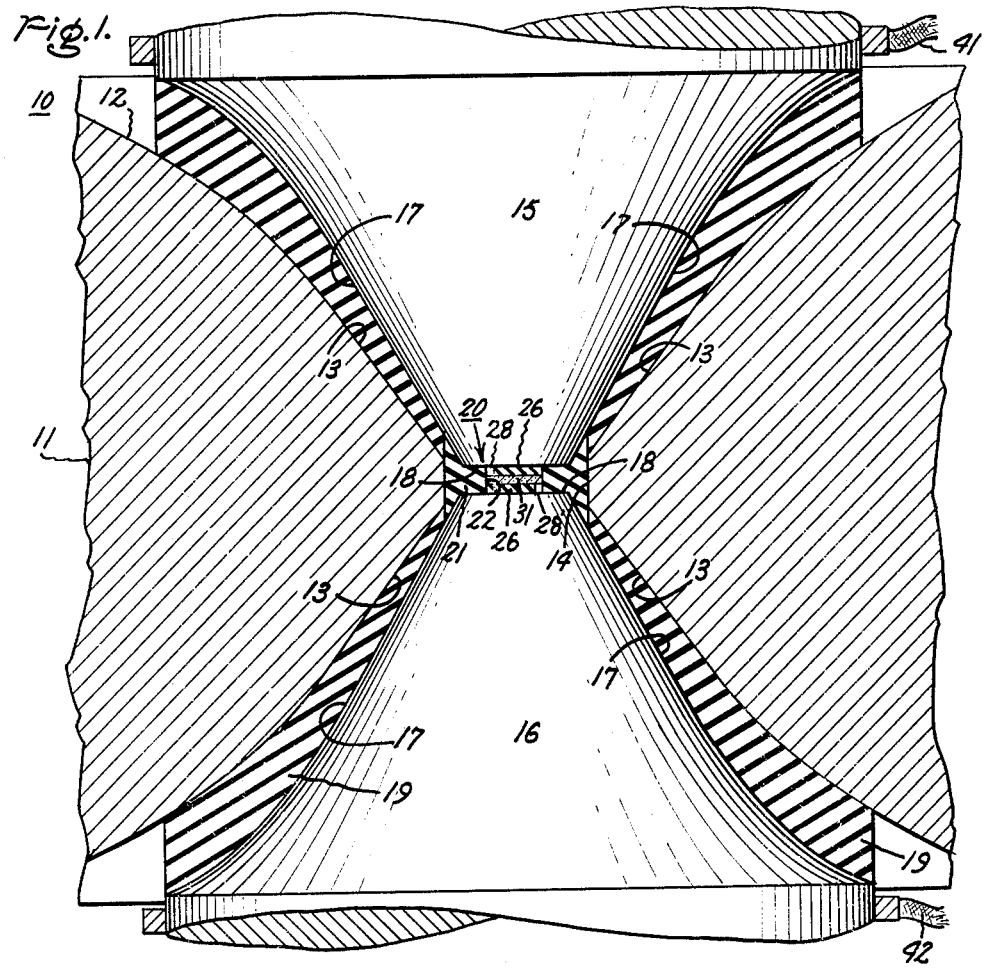
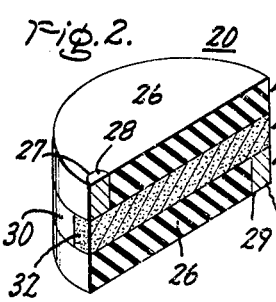
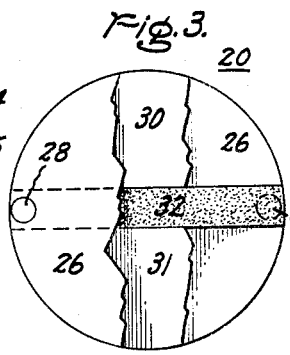
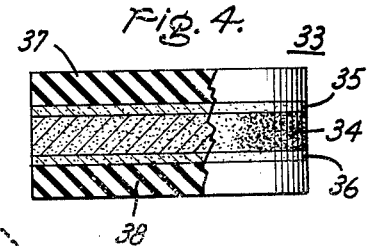
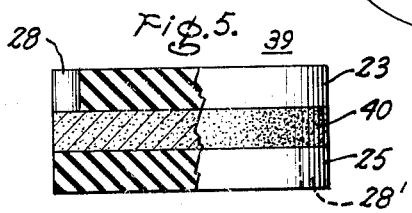
Inventors:
Robert H. Wentorf, Jr.,
Peter Cannon,
by James J. Lichiello
Their Attorney.

Inventors:
Robert H. Wentorf, Jr.;
Peter Cannon,
by James J. Lichiello
Their Attorney.

United States Patent Office 3,212,853
Patented Oct. 19, 1965

3,212,853
HIGH DENSITY SILICON
Robert H. Wentorf, Jr., Schenectady, and Peter Cannon, Alplaus, N.Y., assignors to General Electric Company, a corporation of New York
Filed July 30, 1962, Ser. No. 213,458
1 Claim. (Cl. 23—223.5)

This invention relates to a higher density form of silicon and more particularly to a stable form of silicon having a density significantly above the ordinary density of about 2.33 grams/cm.$^3$ at 25° C. to 2.42 grams/cm.$^3$ at 25° C.

Silicon is a Group IV element of the periodic table of elements, having a diamond structure with a lattice constant of 5.430 A. Its intrinsic electrical resistivity is about $3 \times 10^5$ ohm cm. A more complete description of this element is found in "An Introduction to Semiconductors" by W. Crawford Dunlap, Jr., 1957, John Wiley & Sons Inc., N.Y., N.Y., Chapter II, Library of Congress Catalog Card Number 56–8691. Handbook values of the density of ordinary silicon are about 2.32 grams/cm.$^3$ at 25° C. for high purity single crystal silicon and about 2.42 grams/cm.$^3$ at 25° C. for high purity polycrystalline silicon.

Silicon is basically a poor electrical conductor but by well known doping processes may be converted to a semiconductor of n- or p-type. As such, silicon finds wide applications as semiconductors generally, rectifiers, diodes, etc. However, the useful electrical characteristics of silicon are limited by or dependent on doping processes of a very poor electrical conductor basically. Furthermore, useful applications of the physical characteristics of silicon are yet more limited.

Accordingly, it is an object of this invention to provide a new form of silicon.

It is another object of this invention to provide a new, high density form of silicon.

It is a further object of this invention to change the physical and electrical properties of silicon.

It is another object of this invention to provide a high density form of silicon which is useful as a control element by means of its physical and/or its altered electrical properties.

It has been discovered that the mentioned limitations on the uses of silicon may be modified by changing the unit cell structure of silicon so that not only different electrical characteristics are provided, but also different physical characteristics are obtained which extend the use of silicon to other than electrical applications.

Briefly described, this invention in one form comprises subjecting a lower density silicon to very high pressures to cause a transition of the silicon to a stable higher density form of silicon.

This invention will be better understood when taken in connection with the following description and drawing in which:

FIG. 1 is an illustration of one preferred high pressure apparatus utilized in the practice of this invention;

FIG. 2 is an enlarged view of a reaction vessel utilized in the apparatus of FIG. 1;

FIG. 3 is a cutaway sectional view of the reaction vessel of FIG. 2 illustrating the various parts in their operative relationship;

FIG. 4 is a modified reaction vessel which may be utilized in the apparatus of FIG. 1;

FIG. 5 is an illustration of a further modified reaction vessel; and

Figure 6:
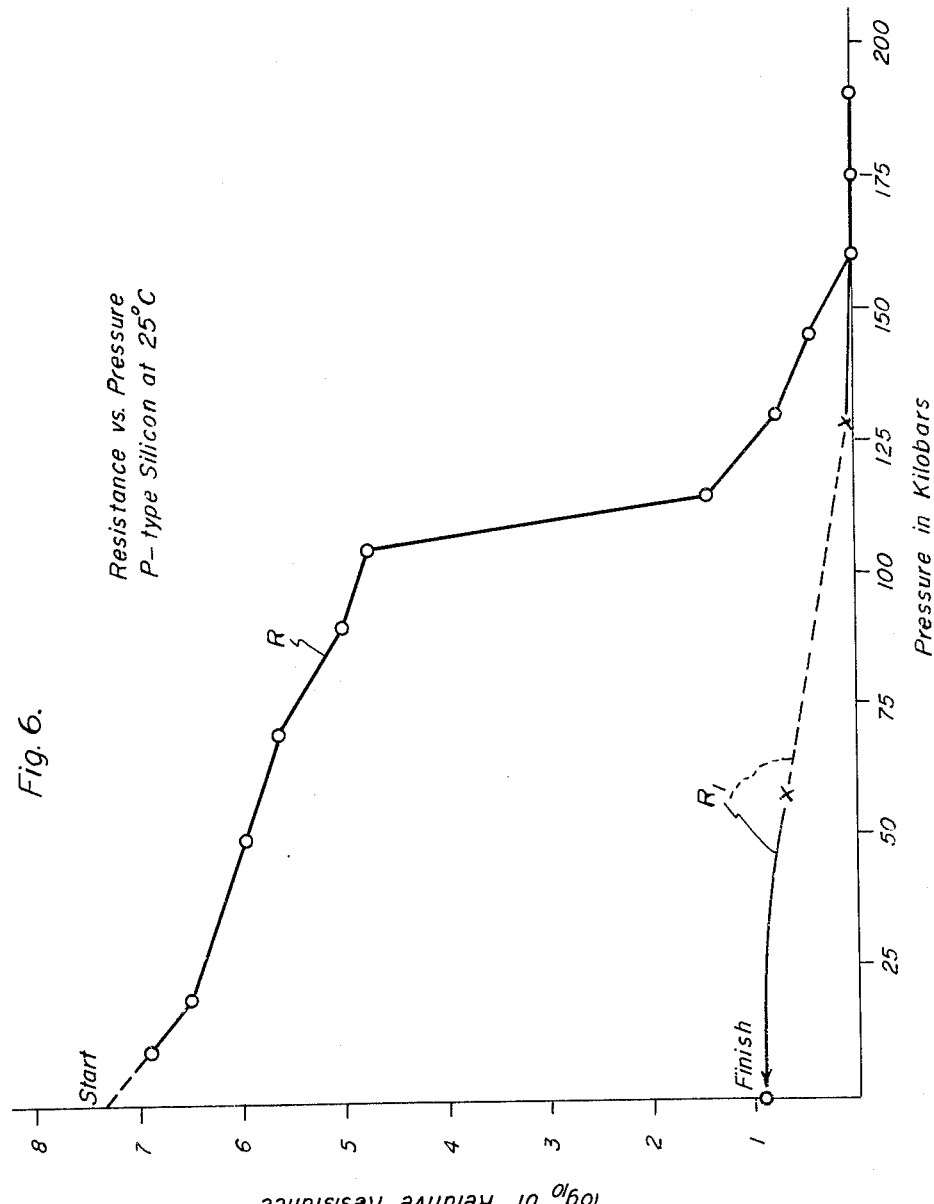
FIG. 6 is a graphic representation of the change in resistance of silicon under the application of very high pressures.

The practice of this invention requires a pressure of the order of 110 kilobars and greater. Pressure apparatuses are available in the art which will provide these and higher pressures. One preferred apparatus is the belt apparatus as described and claimed in U.S. Patent 2,941,248—Hall and a particular use of this type apparatus is described and claimed in U.S. Patent 2,947,610—Hall et al. The aforementioned belt apparatus in 2,941,248—Hall has been modified to attain higher pressures as described and claimed in copending application S.N. 191,914—Bundy, filed May 2, 1962, and assigned to the same assignee as the present invention. The modified belt apparatus is one preferred apparatus employed to practice this invention. Accordingly, the mentioned modified apparatus is illustrated in FIG. 1.

Referring now to FIG. 1, apparatus 10 includes an annular die member 11 having a convergent divergent aperture 12 therethrough and surrounded by a plurality of hard steel binding rings (not shown) for support purposes. One satisfactory material for die member 11 is Carboloy cemented carbide grade 55A. Modification of the die member 11 includes tapered surfaces 13 having an angle of about 52.2° with the horizontal, and a generally right circular cylindrical chamber 14 of 0.200 inch diameter.

A pair of tapered or frustoconical punches 15 and 16 of about 1.0 inch O.D. at their bases are oppositely positioned with respect to each other and concentric with aperture 12 to define a reaction chamber therewith. These punches also utilize a plurality of hard steel binding rings (not shown), for support purposes. One satisfactory material for punches 15 and 16 is Carboloy cemented carbide grade 883. Modification of the punches includes tapering of flank surfaces 17 to a 60° included angle to provide faces 18 of 0.150 inch diameter, and with the tapered portions of the punches being about 0.560 inch in the axial dimension. The combination of the 60° included angle and the 52.2° angle of the tapered surfaces 13 provides a wedge shaped gasket opening therebetween.

A further modification relates to sealing means. Sealing or gasketing is provided by means of single gaskets 19 of pyrophyllite. Gaskets 19 between the punches 15 and 16 and die member 11 are wedge shaped to fit the defined space and of sufficient thickness to establish a distance of 0.060 inch between punch faces 18.

The essential features incorporated by the modifications which provide the apparatus with a capability of reaching very high pressures in the range of 100 to 180 kilobars and above, relate to ratios of certain given dimensions. These dimensions are, (1) the diameter of the punch face portion 18, (2) the distance between the punch face portions 18 in the initial position as illustrated in FIG. 1, before compression, and (3) the slant height of the gasket 19 along the flank or tapered portion 17 of the punches. In operative working examples of the apparatus of this invention, the ratio of the gap, G, or distance between punch faces 18, to the diameter, D, of the face portion 18, is less than about 2.0, preferably below about 1.75. The slant length, L, of gasket 19 as predicated upon the diameter of the face portion 19 is 6 times D, $L/D=6$. These values are compared to those of U.S. Patent 2,941,248—Hall, which are generally $G/D=2.0$ and $L/D$ is less than about 1. These preferred ratios provide a greater amount of lateral support for the punches 15 and 16 without extensively increasing the required component of applied force necessary to compress the gasket for pressure rise in the reaction vessel.

A reaction vessel 20 is positioned between the punch faces 18. In this instance reaction vessel 20 includes a cylindrical or spool shaped pyrophyllite sample holder 21 having a central aperture 22 therethrough. The parts to be positioned in aperture 22 in their operative relationship are more clearly illustrated in FIG. 2 without sample holder 21. Reaction vessel 20 includes both the sample material and its heating means, in the form of a solid right circular cylinder comprising three concentrically adjacent disc assemblies 23, 24, and 25. Disc assembly 23 includes a pyrophyllite disc 26 having a tangential opening 27 therein at the circumference to receive a small wire or rod electrode 28 which is utilized to provide current flow through disc 26. Disc assembly 25 also includes a pyrophyllite disc 26 having a tangential opening 29 therein at the circumference to receive a further small rod or wire electrode 28' for similar electrical conducting purposes as described for electrode 28. Disc assembly 24 includes a pair of laterally spaced apart segmental portions 30, and 31 (not shown), of pyrophyllite, with a bar form of an electrically conductive sample material 32 therebetween. Sample 32 is about 0.020 inch thick by 0.040 inch wide by 0.080 inch long. Each disc assembly 23, 24, and 25 is 0.080 inch diameter by 0.020 inch thick. The wire or rod electrodes 28 and 28' are 0.020 inch diameter and of an electrically conductive material, for example copper or molybdenum.

FIG. 3 illustrates the reaction vessel of FIG. 2 in a top cutaway view for more specific clarification of the operative relationship of the described parts. From either FIG. 2 or FIG. 3, it can be seen that an electrical circuit is established from electrode 28 through sample 32 to electrode 28' for electrical resistance heating of the sampling 32.

FIG. 4 is a modification of reaction vessel 20. In FIG. 4, reaction vessel 33 is a stacked assembly of concentric discs 34, 35, 36, 37, and 38, all of which are about 0.080 inch diameter. Disc 34 is the sample material disc of silicon and about 0.020 inch thick. On each side of the sample disc 34 is a disc of a good pressure transmitting material, for example silver chloride. These discs are illustrated as discs 35 and 36 which are about 0.004 inch thick. At the ends of the assembly of discs 34, 35, and 36 are pyrophyllite discs, illustrated as discs 37 and 38, which are about 0.016 inch thick.

FIG. 5 is a modified form of the reaction vessel of FIG. 2. More particularly, in FIG. 5, reaction vessel 39 includes similar disc assemblies 23 and 25 as described with respect to FIG. 2, and an intermediate sample disc 40 which is of silicon.

Apparatus 10 as described provides a desired pressure in the region above 100 kilobars. Operation of apparatus 10 includes placing the apparatus as illustrated between the platens of a suitable press and causing punches 15 and 16 to move towards each other, thus compressing the reaction vessel and subjecting a sample such as 32, 34 and 40, to high pressures. To calibrate the apparatus for high pressures, the calibration technique as given in U.S. Patents 2,941,247—Hall and 2,947,610—Hall et al. may be employed. This technique includes subjecting certain metals to known pressures where an electrical phase transition of these materials is indicated. For example, during the compression of iron a definite reversible electrical resistance change will be noted at about 130 kilobars. By the same token then, an electrical resistance change in iron denotes 130 kilobars pressure.

The following table is indicative of the metals employed in the calibration of the belt apparatus as described:

*Table 1*

| Metal: | Transition pressure (kilobars) |
|---|---|
| Bismuth I [1] | 25 |
| Thallium | 37 |
| Cesium | 42 |
| Barium I [1] | 59 |
| Bismuth III | 89 |
| Iron | 130 |
| Barium II | 141 |
| Lead | 161 |
| Rubidium | 193 |

[1] Since some metals indicate several transitions with increasing pressure, the Roman numerals indicate the transition utilized, in sequential order.

A more particular description of methods employed to determine the above transition values may be found in the publication (1) "Calibration Techniques in Ultra High Pressures," F. P. Bundy, Journal of Engineering for Industry, May, 1961; Transactions of the ASME, Series B, (2) Proceedings of the American Academy of Arts and Science, P. W. Bridgman, Vol. 74, Page 425, 1942, Vol. 76, Page 1, 1945, and Vol. 76, Page 55, 1948. The Bridgman values were later corrected to their present values, as given in the above Table, by R. A. Fitch, T. F. Slykhouse, H. G. Drickamer, "Journal of Optical Society of America," Vol. 47, No. 11, Pages 1015–1017, Nov. 1957, and A. S. Balchan and H. G. Drickamer, "Review of Scientific Instruments," Vol. 32, No. 3, Pages 308–313, March 1961. By utilizing the electrical resistance changes of the metals as given, a press is suitably calibrated to provide a reading for the approximate pressure within the reaction vessel.

Where desirable, a sample such as sample 32 may be subjected to high temperatures by electrical resistance heating. The current path includes connecting a source of power (not shown) to each punch 15 and 16 by electrodes 41 and 42 so that the current flow is through for example punch 15 to electrode 28, through sample 32 and electrode 28' to punch 16. Additionally, this circuit is also utilized to measure the resistance or change of resistance of the sample. For example, connecting a volt meter across punches 15 and 16, at conductors 41 and 42, and a current meter in series with conductor 41 will provide measurements of heating power, initial and final resistance of the sample, and also changes of resistance with application of pressure or high temperature. Alternatively, a resistance meter or bridge may be connected directly to electrodes 41 and 42.

Other forms of heating both external and internal types may also be provided. For example, the electrical discharge method as described in the aforementioned copending application S.N. 191,914 may also be employed. This method includes the rapid discharge (0–5 milliseconds) of an electrolytic capacitor circuit through the sample 32. Other forms of heating may include a thermite or chemical reaction adjacent a given sample, or the application of electrical wave energy.

When utilizing small currents for resistance measurements only, a small battery may be employed as a source of power. For heating purposes a larger amount of power is required which is conveniently regulated by means of a variable transformer. Such a transformer may be adjusted to supply less than about 1 watt for the resistance measurements at ambient temperatures.

In one exemplary practice of this invention, reaction vessel 20 was assembled utilizing high purity transistor grade single crystal silicon as sample 32. Sample density was about 2.33 grams/cm.³ and its measured electrical resistance was about 400,000 ohms. Reaction vessel 20 was then placed in the apparatus 10 of FIG. 1 and apparatus 10 was placed between the platens of a hydraulic press of 200 ton capacity. The source of power was then connected to establish an electrical resistance circuit as described. Power input to apparatus 10 measured from 1.5 to 7.5 volts and up to 0.1 ampere for a maximum power input of 0.75 watt. The electrical resistance of the sample at about 10 kilobar pressure was about 40,000 ohms. Pressure in the sample was increased slowly over about a period of 5 minutes. The resistance of the sample decreased as pressure increased, with the slope of the resistance curve being steepest at about 110 to 120 kilobars and with a minimum resistance reading of about 0.1 ohm at about 140 kilobars and higher. Upon decreasing the pressure, the sample resistance increased until room pressure was reached. However, at this point the resistance was only about 0.5 ohm.

Upon removal of the reaction vessel it was noted that the sample was smaller in size than the original, i.e., there was a noticeable reduction in height but no apparent change in the other dimensions. A density test was performed on the sample by the well known sink or float method. This involved, briefly, a solution of bromoform and toluene, of known densities, where the solution density was adjusted to the point where the sample would just float or remain suspended. The density of the sample was found to be significantly higher than the original sample, of the order of 8 to 9 percent higher.

X-ray analysis of this sample indicated a cubic crystal structure of 16 atoms per unit cell with a unit cell edge length of 6.60 A. This structure provides, by calculation, a theoretical density of about 2.59 grams/cm.$^3$. Repetitions of the above example included the use of the various reaction vessels as described, with molybdenum and copper as electrode materials, and various maximum pressures. All examples indicated the formation of high density silicon at about the same beginning pressure, about 110 kilobars. Additionally, by means of the circuit as described, some of the samples were subjected to an elevated temperature while pressure was being applied, for example between 25° C. and 800° C.

The following table is indicative of some of these examples. All examples were subjected to X-ray analysis for structure determination, and their densities were determined by the sink or float technique.

*Table II*

| Ex. No. | Reaction Vessel | Max. Pres., Kilobars | Max. Input Heating Power, Watts | Initial Resistance, Ohms | Final Resistance, Ohms | Final Density, g./cm.$^3$ |
|---|---|---|---|---|---|---|
| 1 | 20 | 175 | 0.75 | 4×10$^5$ | 0.4 | 2.51 |
| 2 | 39 | 160 | 0.75 | 1.1×10$^5$ | 2.2 | 2.41 |
| 3 | 39 | 190 | 0.75 | 1,000 | 0.7 | 2.55 |
| 4 | 20 | 190 | *24 | 7×10$^4$ | 0.2 | 2.55 |
| 5 | 39 | 175 | *52 | 1×10$^3$ | 0.3 | 2.55 |
| 6 | 33 | 190 | 0 | 1×10$^4$ | 1 | 2.55 |
| 7 | 20 | 175 | *100 | 2×10$^4$ | 0.1 | 2.55 |

Resistance and density measurements were made at room temperature, approximately 25° C.
* The maximum permanent change in resistance was produced by heating at about 110–130 kilobars pressure. The sample was cooled to 25° C. before pressure was increased or reduced.

In practicing the process of this invention the temperature and pressure increases may be accomplished simultaneously or alternately. Furthermore, the increases in either instance may be in increments or alternate steps. One preferred method is to raise the pressure to a given degree before raising the temperature, for example raising the pressure to 110 kilobars and greater before the temperature rise. In this connection pressure may be additionally raised after the transition has commenced.

Temperature of the sample is estimated as dependent on the amount of electrical power introduced into the reaction vessel. The electrical resistances of the various elements of the circuit are known or easily measured. The thermal and electrical insulating qualities of the reaction vessel material are also known. Based upon these conditions the temperature rise in the various elements are correlated to provide an estimate of the temperature of the sample. For example, an input power of about 50 watts is estimated to provide a temperature of about 800° C. in the sample.

From the above examples it may be seen that a new higher density form of silicon is provided by subjecting for example an ordinary form of silicon of a theoretical density of about 2.32 grams/cm.$^3$ at 25° C. to a high pressure in the range of 110 to 190 kilobars. The density of the recovered silicon is significantly greater than the original silicon and ranges from greater than about 2.4 to 2.55 grams/cm.$^3$ at 25° C. The recovered silicon is polycrystalline when the starting material is single crystal silicon. However, the recovered polycrystalline silicon has a density greater than ordinary polycrystalline silicon I. In addition the recovered material has a considerably reduced electrical resistivity, and its intrinsic electrical resistivity is less than about 100 ohm/cm.

The more dense forms of given materials are usually followed by a Roman numeral designating their particular phase. For example, Bismuth transitions are indicated as Bismuth I, Bismuth II, Bismuth III, etc. In the practice of this invention the original sample is denoted as silicon I, i.e., having a density in the range of 2.33 to 2.42 grams/cm.$^3$ at 25° C. This sample is subjected to high pressures in the apparatus as described with resistance readings being recorded at various pressures on the uploading cycle and at various positions on the unloading cycle. A typical resistance curve of such cycles is illustrated in FIG. 6.

Referring to FIG. 6, curve R is the resistance curve for a starting silicon I sample material. Upon application of pressure, a transition commences at a minimum pressure of about 105 kilobars and extends to about 115 kilobars. It is in this range, 105 to 115 kilobars, where the electrical resistance curve is decreasing more steeply. This mentioned transition is believed to be that which provides a higher density silicon, for example in the range of 105 to 140 kilobars or preferably above about 110 kilobars. Thus, at these pressures a higher density form of silicon exists. Upon unloading, the resistance unloading curve $R_1$ rises gradually to a final resistance at room pressure which is marked lower than the initial resistance. Because of the pressure or expansion characteristics of the reaction vessel assembly, gaskets, etc., the pressure reading in kilobars is not so accurate on the unloading cycle. It is believed that this gradual rise in resistance to the lower resistance reading indicates no reversion occurs to the original silicon form. Therefore, the silicon recovered is referred to herein and in the claims as silicon II, which is stable at room pressure and temperature, and is characterized particularly as having a density greater than silicon I, i.e., the starting material. In the practice of this invention pressure conditions are carried into the high density silicon region for ultimate recovery of silicon II.

The above example was repeated many times with distinguishing variations. For example, different reaction vessels with the different material electrodes as described were employed. These variations did not markedly affect the process or the product of this invention. No particular effects were noted in varying the unloading time. Certain effects taken into consideration to determine minimum transition pressure relate to the reduction in volume of the sample during transition (requiring the punches to move or be moved more deeply into the reaction chamber) and the effect of temperature rise in the various materials in the reaction chamber.

The pressure at which the transition just commences is generally about 105 kilobars. The transition is definite at about 110 kilobars and most of the resistance change is completed at about 140 kilobars. By halting pressure rise on duplicate examples, at a series of increasing steps, it was found, by X-ray and density measurement, that the percent conversion to the dense form was also increasing but was less than the percent conversion found at higher pressures. Thus, the transition from the less dense to the higher dense form is gradual and takes place over a range of pressure, although commencing at a threshold pressure. All transition appears to be complete at about 190 kilobars.

The effect of a temperature rise in the sample is to reduce the threshold pressure only very slightly, but to complete the transition in a more narrow pressure range. A temperature rise, however, is not necessary for the transition to occur.

When the high density form of silicon is exposed to high temperatures, the density is lowered. However, the dense form does not change immediately or completely to the original condition under controlled conditions. For example, exposure to a temperature of about 180° C. for a period of about 45 minutes causes lowering of density toward the original density, but the silicon acquires a crystal structure which is hexagonal (analogous to wurtzite) rather than cubic (analogous to zinc blende). This hexagonal structure silicon represents a further new form of silicon, but it has approximately the same density as ordinary cubic silicon. The hexagonal structure of this silicon was determined by X-ray analysis.

The high density form of silicon may be utilized as an electrical conductor because of its increased electrical conductivity or as an energy storage means because of its expansion characteristics when exposed to elevated temperatures. The dense form of silicon may be a control element or sensing element since the change to the less dense form is indicative of a high temperature having been reached. As one example the dense form of silicon may be a resistance element in a simple circuit so that at the change or reversion temperature the resistance increases sharply and irreversibly to denote a given temperature being reached. Alternatively, the expansion characteristics inherent in the change to the lower density form may be employed to provide an actuating force at elevated temperatures.

While a specific article and a method for its production in accordance with this invention is described and shown, it is not intended that the invention be limited to the particular description nor to the particular method indicated, and it is intended by the appended claim to cover all modifications within the spirit and scope of this invention.

What we claim as new and desire to secure by Letters Patent of the United States is:

Silicon having a density between about 2.55 grams/cm.$^3$ at 25° C. and about 2.59 grams/cm.$^3$ at 25° C., and a cubic crystal structure having a unit cell edge length of 6.60 angstroms.

References Cited by the Examiner

UNITED STATES PATENTS

| | | | |
|---|---|---|---|
| 2,941,247 | 6/60 | Bundy | 18—16.5 |
| 2,947,617 | 8/60 | Wentorf | 23—191 X |
| 2,995,776 | 8/61 | Giardini et al. | 18—16.5 |

OTHER REFERENCES

Handbook of Chemistry and Physics, 43rd edition, 1961, pages 646–647.
The Chem. Rubber Pub. Co., Cleveland, Ohio.
"The Physics and Chem. of Solids" (Pergamon Press, New York), vol. 23, May 1962, pages 451, 452.

MAURICE A. BRINDISI, *Primary Examiner*.